United States Patent [19]

Philo

[11] Patent Number: 5,022,786

[45] Date of Patent: Jun. 11, 1991

[54] METHOD AND APPARATUS FOR THE RECOVERY AND TREATMENT OF GROUND WATER CONTAMINATED BY HAZARDOUS WASTE

[76] Inventor: Kenneth W. Philo, 7 Palm Ave., San Rafael, Calif. 94901

[21] Appl. No.: 527,621

[22] Filed: May 23, 1990

[51] Int. Cl.$^5$ .................... E02B 11/00; E02D 29/00
[52] U.S. Cl. ................... 405/128; 52/169.5; 405/129; 405/52; 405/248
[58] Field of Search ............ 405/128, 129, 258, 267, 405/232, 281, 274, 248, 52; 52/169.5

[56] References Cited

U.S. PATENT DOCUMENTS

| | | | |
|---|---|---|---|
| 770,475 | 9/1904 | Poor | 405/232 X |
| 863,837 | 8/1907 | Draro | 405/281 |
| 3,654,765 | 4/1972 | Healy et al. | 52/169.5 X |
| 4,045,964 | 9/1977 | Barclay | 52/169.5 X |
| 4,136,500 | 1/1979 | DiFiore | 52/169.5 X |
| 4,288,174 | 9/1981 | Laws | 405/129 X |
| 4,741,644 | 5/1988 | Cavalli et al. | 405/128 X |
| 4,808,039 | 2/1989 | Fischer | 405/128 X |
| 4,916,937 | 4/1990 | Robertson et al. | 405/128 X |

Primary Examiner—Dennis L. Taylor
Attorney, Agent, or Firm—Townsend and Townsend

[57] ABSTRACT

A barrier for intercepting a flow of ground water flowing beneath a dump site holding hazardous waste seeping through the ground into the ground water flow. The barrier is formed of a plurality of side-by-side, interlocked wood, concrete, steel or the like sheets which are power driven directly into the ground without first forming trenches. The sheets define a network of horizontal, open channels which communicate with intermittent, spaced apart vertical conduits that extend over the height of the barrier and terminate in open ends. A filter material covers the open channels and is recessed relative to the lower edge of the sheet to prevent it from being damaged when the sheet is driven into the ground. Contaminated ground water flowing into the channels flows through them and the vertical conduits according to prevailing pressure conditions and is pumped from at least one of the conduits for treatment above ground and the removal of hazardous waste contaminants before the treated, hazardous waste-free water is returned to the ground at a location remote from the waste site, e.g., on the downstream side of the barrier.

32 Claims, 2 Drawing Sheets

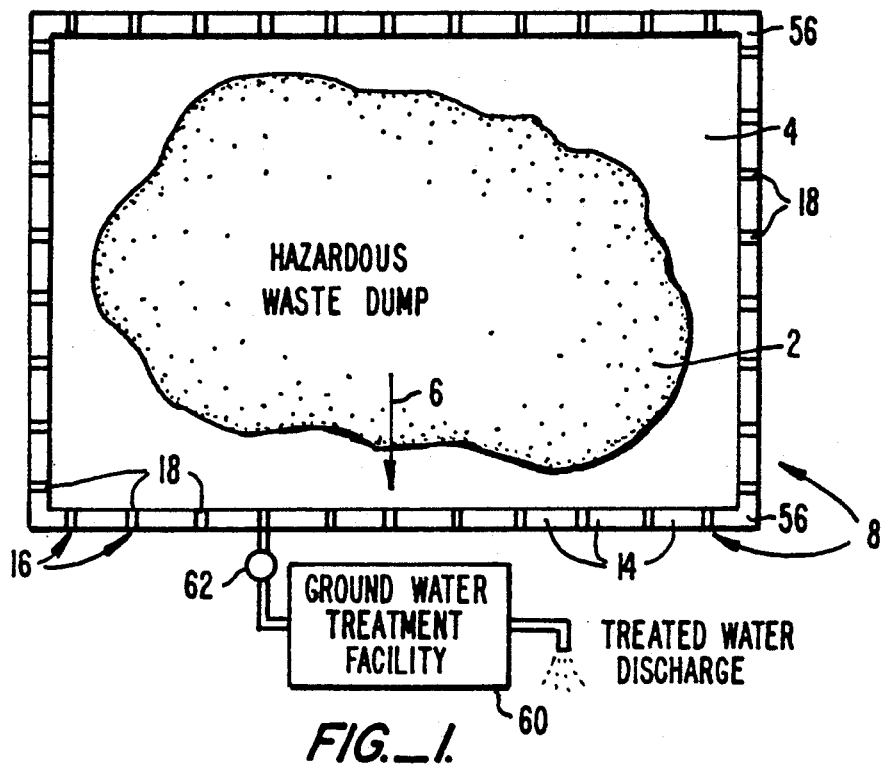
FIG._1.
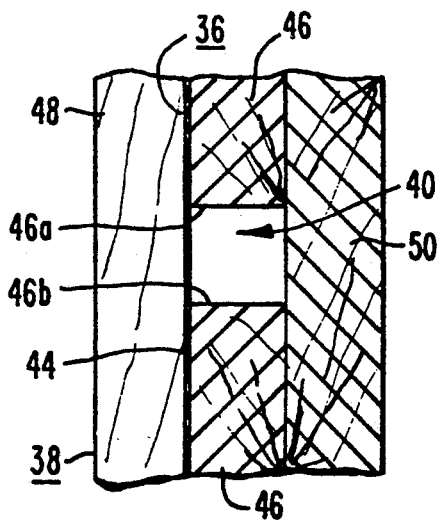
FIG._5.
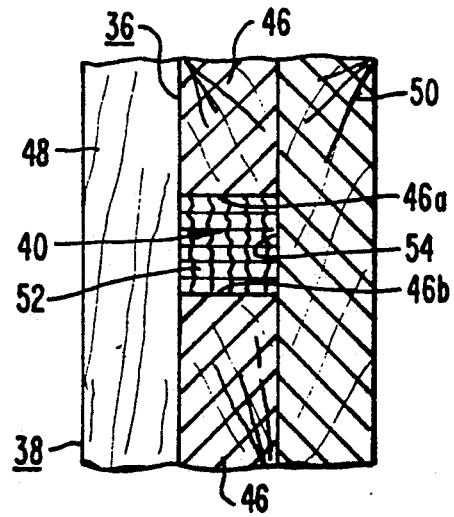
FIG._6.

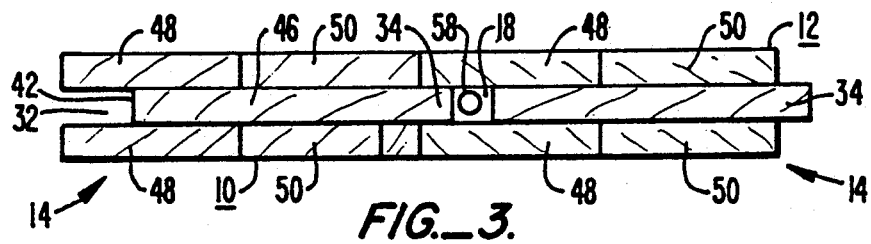
FIG._3.
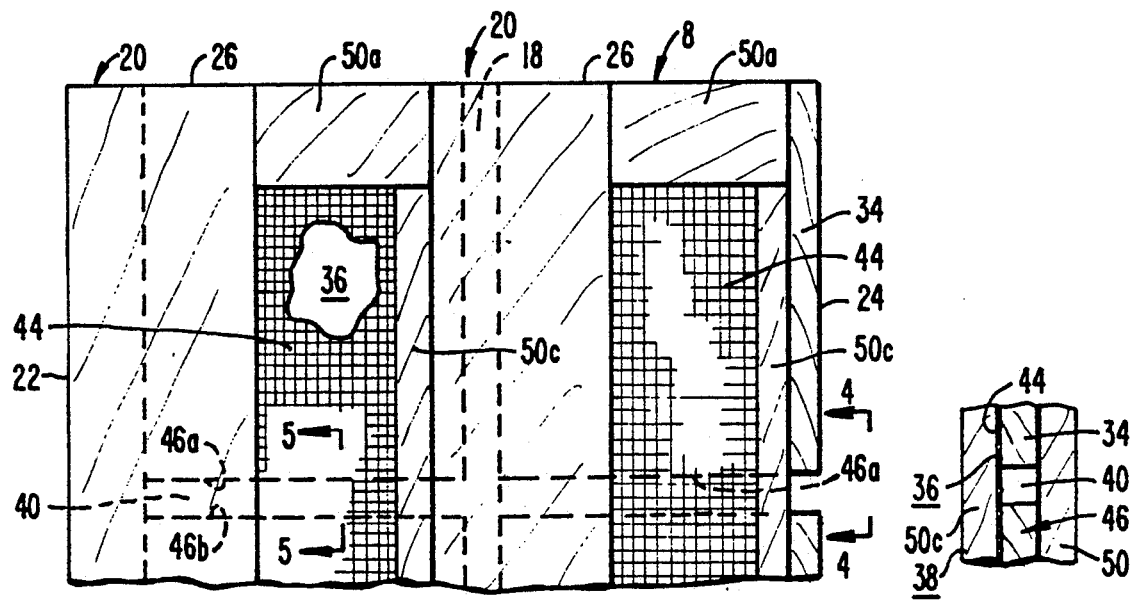
FIG._4.
FIG._2.

METHOD AND APPARATUS FOR THE RECOVERY AND TREATMENT OF GROUND WATER CONTAMINATED BY HAZARDOUS WASTE

BACKGROUND OF THE INVENTION

Many of the waste dump sites located throughout the U.S. and indeed, throughout the world, contain hazardous waste including toxic substances. Over time, such hazardous waste can enter the ground, for example with rainwater, and can come in contact with ground water beneath the dump site. Where this occurs, the ground water becomes contaminated.

Such ground water contamination renders the ground water beneath the dump site unusable. Normally, the ground water slowly flows beneath the dump site and thereby carries the contaminants which infiltrated at the dump site with it. Thus, a single dump can contaminate the ground water over large geographical areas far beyond the dump site. This renders the contaminated ground water unusable for most purposes or requires the installation of costly ground water treatment facilities where the hazardous contaminants are removed before the water can be used. As the flow spreads, increasingly large volumes of ground water become contaminated, thereby requiring increasingly large treatment facilities which are expensive to install and to operate.

Thus, efforts are being made to prevent hazardous waste from contaminating ground water flows by containing the contaminants at the dump site and preventing their escape therefrom. The U.S. Environmental Protection Agency (EPA) provides the following guidance for preventing the contamination of ground water flows in the "Remedial Action at Waste Disposal Sites" section of the EPA Handbook which, in relevant parts provides:

"Ground Water Controls"

"Control of ground water contamination involves one of four options: (1) containment of a plume; (2) removal of a plume after measures have been taken to halt the source of contamination; (3) diversion of ground water to prevent clean water from flowing through a source of contamination or to prevent contaminated ground water from contacting a drinking water supply; or (4) prevention of leachate formation by lowering the water table beneath the source of contamination."

"Remedial technologies for controlling ground water contamination problems are generally placed in one of four categories: (1) ground water pumping, involving extraction of water from or in injection of water into wells to capture a plume or alter the direction of ground water movement; (2) subsurface drains, consisting of gravity collection systems designed to intercept ground water; (3) low permeability barriers, consisting of a vertical wall of low permeability materials constructed underground to divert ground water flow or minimize leachate generation and plume movement; or (4) in situ treatment methods to biologically or chemically remove or attenuate contaminants in the subsurface. These technologies can be used singularly or in combination to control ground water contamination."

SUMMARY OF THE INVENTION

The present invention seeks to intercept the contaminated ground water flow in the vicinity, e.g., at the perimeter of the dump site, bringing it to the surface for treatment, that is for the removal of contaminants therefrom, and thereafter using the treated, contaminant-free water for other purposes including, for example, returning it to the ground at a point where it can no longer be contaminated. This involves the construction of a barrier downstream (in the direction of ground water flow) of the dump site, collecting the intercepted and contaminated ground water, and bringing it to the surface for appropriate treatment.

In the past, such barriers had to be constructed by digging sometimes very deep trenches, forming the required barriers and/or collection channels and thereafter closing the trenches. This is time-consuming and expensive work. In addition, it requires the removal of relatively large volumes of ground which is frequently contaminated with hazardous and/or toxic substances. This has two highly undesirable side effects.

First, digging contaminated ground exposes the workmen to the contaminants which is a serious health hazard. Secondly, the dug-up contaminated ground itself is hazardous waste which is difficult and expensive to dispose of and, if at all possible, should not be generated to begin with.

The present invention seeks to overcome the shortcomings encountered in the past by providing a barrier downstream of the dump site which is erected in situ by driving the barrier directly into the ground as contrasted with the heretofore common practice of first digging a trench. This is accomplished by constructing the barrier of a multiplicity of elongated sections or sheets which are individually driven into the ground by hammering, vibrating, water jetting or the like while adjoining edges of the sheet are interlocked in a substantially water-impermeable manner. The sheets are constructed so that the barrier forms generally horizontal, open channels which face in the upstream direction and which are fluidly connected with intermittent, spaced apart vertical conduits that extend from the bottom of the barrier to the top thereof above ground level. An appropriate filter material placed across the open channels and/or extending into the channels allows contaminated ground water reaching the barrier to enter the channels while keeping the surrounding ground, rocks, etc. out of the channel.

Water entering the channels flows according to prevailing pressure conditions through the channels and the vertical drain conduits. The water collecting in one or more of the vertical drains is pumped out of the drain to above ground for appropriate treatment to remove hazardous contaminants therefrom. After treatment, the water can be returned to the ground, at the downstream side of the barrier to prevent it from again coming into contact with hazardous contaminants from the dump site. Alternatively, it can be flowed elsewhere for appropriate use.

With the present invention, it is thus possible to drive a contaminated ground water flow barrier and removal system directly into the ground, that is without the need for excavating contaminated ground and thereafter appropriately disposing of it. This greatly enhances the safety of the installation procedure and significantly reduces costs. Thus, the present invention provides a safer and more cost-effective way for preventing the contamination of ground water flows by hazardous materials.

In its simplest form, the present invention contemplates the construction of a generally linear barrier immediately downstream of the hazardous waste dump site. Alternatively, the dump site can be partially or completely encircled with the barrier by constructing it, for example, in an L-shaped configuration or as an enclosing, square, rectangular or the like barrier.

The individual sheets which make up the barrier can be constructed of such materials as wood, concrete, steel or any other suitable material although, at the present and for cost reasons, their construction of wood is preferred. Generally speaking, each such sheet has a first longitudinal (vertical) edge which defines a groove and a second, opposite longitudinal edge which defines a tongue adapted to fit into the groove when two sheets are interconnected so as to form a vertical drain conduit between the bottom of the groove and the top of the tongue when two sheets are joined edge-to-edge.

The sheet further includes at least one and, if desired two or more horizontal channels which extend from the bottom of the groove at one longitudinal edge to the top of the tongue at the other longitudinal edge, that is across the full width of the channel. A center portion of the channel, that is a portion spaced from the longitudinal edges as well as from the top and especially from the bottom edge of the sheet is recessed into the side surface of the sheet which will face in the upstream direction upon installation to expose and open an upstream facing portion of the horizontal channel. Filter material is applied across the open side of the channel so that water can collect in the channel while surrounding ground is kept out of it. In a presently preferred embodiment of the invention, relatively rigid sheets or blocks, which are commercially available on the market, are used as filter material. By recessing the open portion of the channel, and thereby the filter material, damage to the latter while the sheet is driven into the ground from rubbing against the ground is prevented.

BRIEF DESCRIPTION OF THE DRAWINGS

FIG. 1 is a schematic diagram of a dump site in which a contaminated ground water extraction system constructed in accordance with the present invention has been installed;

FIG. 2 is a side elevational view of two individual sections or sheets, constructed in accordance with the present invention, of which the ground water barrier of the present invention is made;

FIG. 3 is a plan view of the two sheets of the present invention shown in FIG. 2;

FIG. 4 is a partial, enlarged, side elevational end view of the sheet and is taken on line 4—4 of FIG. 2;

FIG. 5 is a partial, enlarged, cross-sectional view of a portion of a sheet and is taken on line 5—5 of FIG. 2; and FIG. 6 is a partial, enlarged, cross-sectional view similar to FIG. 5 and illustrates another embodiment of the present invention.

DESCRIPTION OF THE PREFERRED EMBODIMENT

FIG. 1 schematically illustrates a dump site 2 which contains amongst others hazardous waste such as toxic chemicals, heavy metals and the like and where the hazardous waste lies on or is buried in ground 4. Some distance below ground level, ground water flows in the direction of arrow 6. A generally upright, vertical barrier 8 extends into the ground downstream (in the direction of ground water flow) from dump site 2. The barrier is generally transverse, e.g. perpendicular to the ground water flow, has an upstream side 10 and a downstream side 12 and extends from the surface into the ground to a depth sufficient to intercept the ground water flow. Typically, the barrier will extend to a depth where there is a substantially water-impermeable ground layer, e.g., a layer of clay, which defines the lower extent of the ground water flow immediately beneath the dump site. Under certain conditions, it may be sufficient if the lower edge of the barrier does not extend that far down and, instead, only extends into the ground water flow to a level beneath the contamination plume, that is to a level which is not reached by the contaminants.

Referring now to all drawings, barrier 8 is constructed of multiple, side-by-side sheets 14, the adjoining edges of which form substantially water-impermeable interlocks 16 including upright drain conduits 18 which have open ends 20 above ground. Each sheet has an elongated, generally rectangular configuration defined by a pair of spaced apart, elongated, vertical edges 22, 24, a top edge 26 and a bottom edge 28. For purposes further described below, the bottom edge includes a diagonal portion 30 which extends from one edge, e.g., edge 24 towards the other edge.

Side edge 22 of the sheet defines a groove 32 of a given depth and the opposite vertical edge defines a projecting tongue 34 of a height less than the depth of the groove. The tongue is configured so that it can extend into the groove when the sheets are side-by-side and interengaged. Since the height of the tongue is less than the depth of the groove, vertical drain conduits 18 are thereby formed at the interface between any two adjoining sheets.

A center portion 36 of the sheet, which is spaced from the sheet edges, is recessed relative to a remainder of an upstream facing (when installed in barrier 8) side 38 as is clearly illustrated in FIG. 2.

Each sheet includes at least one generally horizontally oriented channel 40 which extends from bottom 42 of groove 32 to the top of tongue 34. The channel is positioned and dimensioned so that it intersects the recessed surface portion 36 of the sheet and, therefore, the channel is open over the horizontal extent of the recessed surface portion. A sheet of filter material 44 is placed across the open portion of channel 40 by, for example, securing the sheet to the recessed surface portion.

In a presently preferred embodiment of the invention, sheet 14 is constructed of a plurality of wooden boards or panels as follows. A center board 46 is defined by upper and lower center board sections opposing edges 46a and 46b of which are spaced apart to define channel 40. A pair of first sideboards 48 are secured, e.g. nailed or bolted to the center board. The first side boards project past a longitudinal edge of the center board as is best illustrated in FIG. 3 so that the center board and the projecting portions of the side boards define groove 32 with the longitudinal edge of the center board defining groove bottom 42.

A pair of second side boards abut the first pair and they have a width less than the remaining width of the center board projecting to the right (as seen in FIG. 3) of the first pair of side boards to thereby define tongue 34. The side board on the upstream facing surface 38 includes a cutout which defines a recessed center portion 36 of the sheet. Typically, this board will be constructed of three sections, a top section 50a, a bottom section 50b and an interconnecting post 50c although the recess can be formed as well by sawing a cutout into the board.

In one embodiment of the present invention, filtration sheet 44 covers a surface area larger than the surface area of recessed center portion 36 and it is squeezed between opposing faces of side boards 48,50 on the upstream side 38 of the sheet to retain it in position. Alternatively, the sheet may have a configuration equal to or smaller than that of the center portion and can be directly secured to the underlying center board in any suitable manner such as by bonding, nailing, bolting or the like.

The type of filter sheet that is being used is best chosen to suit the conditions prevailing at the dump site. It may include perforated metal sheets, filter cloth or composite sheets and it is preferred that the sheet is relatively rigid. A filter material especially well suited and presently preferred is available under the trademark DRAIN-IT from Atlantic Construction Fabrics, Inc. of Richmond, Virginia. This filter material is a polyethylene filter fabric and provides for a high water flow through the filter while it keeps ground, sand, rocks and dirt out. DRAIN-IT filter fabrics are available in sheets ranging in thickness from a fraction of an inch to as much as 2" or more.

In an alternate embodiment of the invention, shown in FIG. 6, filter material is placed into channel 40, that is a rectangular block of filter material 52 substantially completely fills the cross section of channel to and extends from bottom 54 of the channel to its open end so that the filter is substantially flush with recessed center portion 36 of the sheet. DRAIN-IT filter material discussed above is particularly suitable for use in this manner because it permits water flow perpendicular to the face of the material as well as parallel thereto. Thus, when the sheet is part of barrier 8, ground water contacting the face of filter block 52 enters into the channel and then flows along the channel to one or the other of the adjoining vertical drain conduits according to the prevailing pressure conditions.

Center board 46 and side board pairs 48, 50 are suitably secured to each other by nailing, bolting, clamping, bonding or the like.

Sheet 14 can equally be constructed of other materials, such as concrete for example. When made of concrete, it is given substantially the same shape and configuration as the sheet illustrated in the drawings and described in greater detail above when constructed of assembled wooden boards. The filter sheet 44, or filtration block 52 can be cast with the concrete, where this is feasible. Alternatively, to prevent possible plugging of the filter material by liquid concrete, it is applied and secured to the concrete after it has cured.

In a presently preferred embodiment of the invention, the sheet has a width of between 20 to 24", a height as required to penetrate the ground to the desired level and an overall thickness of about 6". When constructed of assembled wooden boards, this means that boards of 2" thickness are used. The depth of groove 32 is selected to be 4", the height of tongue 34 is 2", so that the vertical drain conduit 18 has a dimension of 2"×2" while the width of recessed center portion 36 on the upstream side of the sheet is in the range of between about 6-10". Typically, the horizontal drain channel 40 has a width in the range of between 2-6" and a depth corresponding to the thickness of the center boards, in the illustrated embodiment about 2".

Turning now to the installation of a barrier constructed in accordance with the present invention, it is installed spaced from the boundary of dump site 2. A first, linear barrier 8 is formed by positioning a first sheet on top of the ground and orienting it so that it is substantially transverse to the ground water flow. The sheet is then conventionally driven into the ground with a hammer, a vibrator or by jetting water into the ground immediately beneath the lower edge of the sheet to fluidize the ground. The latter alternative is particularly suitable for relatively heavy, e.g., concrete sheets because once the ground beneath the sheet is fluidized, the weight of the panel will typically force it downwardly. To facilitate jetting water beneath the sheet, a water conduit (not separately shown) which extends from the top edge to the bottom edge may be incorporated in, e.g., cast with the concrete sheet.

Driving continues until the lower edge of the sheet has penetrated to the desired depth, e.g., to a water-impermeable layer of clay beneath the ground water flow. Thereafter, the second sheet is aligned with the already installed sheet by fitting tongue 34 on the just-installed sheet into groove 32 of the next sheet. While maintaining the fresh sheet aligned with the first sheet, it is driven into the ground until its top edge 26 is substantially flush with the top edge of the already installed sheet.

It will be noted that the diagonal bottom edge section 30 facilitates driving the sheet into the ground and, further, that it generates a lateral component force which biases the lower end of the sheet towards the already installed sheet, thereby maintaining the opposing tongue and groove connected and aligned. As a result, when the second sheet is fully installed, it forms a substantially water-impermeable interface at the joint between the two sheets and the two sheets define a vertical drain conduit 18.

The above-described procedure is repeated until the entire length of barrier 8 has been installed.

If desired, the barrier can be extended by including an L-shaped corner piece 56, which may be solid but preferably also includes a water flow channel (not separately shown) to interconnect the adjoining, perpendicular sheets, as well as the adjoining drain conduits 18. In addition, the corner piece includes a tongue and a groove shaped complimentary to the tongue and grooves on the sheets to form the required connection. An L-shaped barrier wall is preferable for those applications where there is danger of a lateral (in the direction of arrow 6) water flow to prevent contaminated water from escaping past the ends of the linear barrier.

At times, it is desirable to completely encircle the dump site 2 with a barrier 8 as is illustrated in FIG. 1. In such a case, the barrier, constructed and installed as above described, is rectilinearly extended to form a square, rectangular or the like barrier which completely surrounds the dump site.

Turning now to the operation and use of the barrier 8, ground water flowing beneath the dump site and contaminated with hazardous waste is intercepted by the barrier, i.e., the ground water flow impinges on the upstream side 10 thereof. The ground water flow drains into the horizontal channels 40 and flows along the channels into the vertical drain conduits 18. A suitable pump 62 connected to a drain pipe 48, which may either be the suction pipe of the pump (when the pump is located above ground) or the pressure pipe (when the pump is a sump pump, for example), pumps water from at least one vertical drain 18 to a ground water treatment facility 60 where the water is treated by removing and/or neutralizing hazardous contaminants therein. Once treated and contaminant-free, the treated water can be discharged, directly onto the ground on the downstream side 12 of the barrier, or it can be flowed via a suitable pipeline (not shown) to another site for use elsewhere.

As the pump 62 pumps water out of a given drain conduit 18, the water level therein drops, thereby creating a pressure head on the water in all remaining conduits and horizontal channels which causes the water therein to flow towards the drain conduit from which water is removed. As a result of the network of fluidly interconnected channels and conduits, water can be pumped out of any one or more of the conduits. This makes it also possible to accommodate installations with relatively greater or lesser ground water flows by installing a greater or lesser number of pumps as may be required.

What is claimed is:

1. A method for removing hazardous waste generated at a dump site from ground water flowing beneath the site comprising the steps of:
   driving a multiplicity of elongated, upright sheets directly into the ground and interconnecting the sheets so that they form a substantially water-impermeable barrier proximate to and spaced from a periphery of the site and positioned so that the barrier intercepts the ground water flow beneath the site;
   forming generally horizontal, open channels in the sheets which face the ground water flow, generally upright conduits between adjoining sheets, and fluidly interconnecting the channels and the conduits;
   positioning a filter across the channels to permit ground water to collect in the channels and prevent ground from entering the channels;
   flowing the collected ground water along the channels and into and through the conduits; and
   pumping ground water collected in at least one of the conduits through an open end of the conduit at the top of the barrier;
   whereby contaminated water is prevented from flowing past the wall and a contamination of ground water on a downstream side of the barrier is prevented.

2. A method according to claim 1 wherein the step of interconnecting comprises the step of forming tongue and groove connections along adjoining sides of the sheets and driving each successive sheet into the ground while biasing the driven sheet towards the adjacent sheet already in the ground to thereby maintain the corresponding tongues and groove engaged.

3. A method according to claim 2 wherein the step of forming the conduits comprises the steps of giving the grooves in the sheets a depth which is greater than a height of the corresponding tongues whereby the conduits are formed by the hollow spaces between tops of the tongues and bottoms of the grooves.

4. A method according to claim 1 wherein the step of positioning comprises the step of applying a filter sheet across open sides of the channels.

5. A method according to claim 1 wherein the step of positioning comprise the step of placing a filter element into the channel which substantially fills a cross section of the channel, which is flush with an open face of the channel, and which permits water to flow longitudinally along the channel.

6. A method according to claim 1 including the step of removing contaminants from the water pumped out of the conduit, and returning the contaminant-free water to the ground on the downstream side of the barrier opposite the dump site.

7. A method according to claim 1 wherein the step of driving comprises the step of vibrating the sheets into the ground.

8. A method according to claim 1 wherein the step of driving comprises the step of hammering the sheets into the ground.

9. A method according to claim 1 wherein the step of driving comprises the step of injecting pressurized water into the ground immediately below a lower end of the sheet to thereby fluidize the ground, and simultaneously forcing the sheet into the ground.

10. A method according to claim 1 wherein the step of driving comprises the step of erecting a linear barrier.

11. A method according to claim 1 wherein the step of driving comprises the step of constructing a barrier which substantially completely surrounds the dump site.

12. A method according to claim 1 wherein the step of driving comprises the step of constructing a generally L-shaped barrier.

13. Installation for the recovery of ground water contaminated by hazardous waste seeping through the ground into contact with the ground water at a dump site, the installation comprising:
   a plurality of upright, side-by-side and interlocked sheets defining an upright barrier extending from ground level into the ground water flow, an upstream side of the sheets facing the ground water flow and a downstream side of the sheets facing in the opposite direction;
   each sheet forming a generally horizontally oriented, open channel on the upstream side of the sheet, a generally vertical groove of a given depth extending over a longitudinal edge of the sheet and in fluid communication with the horizontal channel, an opposite, longitudinal edge of the sheet defining a tongue extending into a corresponding groove of an adjoining sheet, having a height less than the depth of the groove and a top in fluid communication with the channel to thereby form a generally vertical conduit with the adjacent sheet which is in fluid communication with the horizontal channel, and filter material on the upstream side of the sheet covering the channel; and
   means for pumping contaminated ground water from a vertical conduit for subsequent treatment and disposal;
   whereby the contaminated ground water flow is intercepted by the barrier, collects in the horizontal channels and flows through them and through the vertical conduits to the pumping means for removal from said conduit.

14. An installation according to claim 13 including means for receiving ground water pumped by the pumping means from the conduit in the barrier and for removing hazardous contaminants therefrom; and means for returning, treated and hazardous waste contaminant-free water to the ground at the downstream side of the sheets.

15. An installation according to claim 13 wherein the barrier forms a substantially linear wall.

16. An installation according to claim 13 wherein the barrier forms a generally L-shaped wall.

17. An installation according to claim 13 wherein the barrier encircles a substantial portion of the periphery of the dump site.

18. An installation according to claim 13 wherein the barrier extends into a substantially water-impermeable layer of ground beneath the ground water flow.

19. An installation according to claim 13 wherein the sheets are constructed of wood.

20. An installation according to claim 13 wherein the sheets are constructed of concrete.

21. An installation according to claim 13 wherein the sheets are constructed of a metal.

22. An installation according to claim 13 wherein at least a portion of a lower edge of the sheets extends generally diagonally from one vertical edge towards the other vertical edge of the sheet.

23. An installation according to claim 22 wherein the portion of the lower edge slopes downwardly from the edge of the sheet defining the tongue to the edge defining the groove.

24. An installation for the recovery of ground water contaminated by hazardous waste migrating downwardly through the ground at a hazardous waste dump site and flowing beneath the dump site, the installation comprising:

an upright barrier extending from ground level at least partially into the ground water flow, the barrier being constructed of a plurality of side-by-side, interlocked and water impermeable sheets driven directly into the ground and defining a network of alternating, generally horizontally oriented open channels facing in an upstream direction towards the ground water flow and intermittent, spaced-apart generally vertical conduits at least some of which terminate in open, upper ends and which are in fluid communication with the channels on either side, of the conduit, whereby water entering the channels is free to flow along the channels and through the conduits according to prevailing pressure conditions;

a filter material covering open sides of the channels to enable ground water to flow into the channels while preventing ground from entering the channels; and pumping means in communication with at least one of the conduits for pumping water accumulating in the conduit to the surface for subsequent treatment and removal of hazardous waste contaminants so that the water can be returned to the ground in treated, safe form on a downstream side of the barrier.

25. An installation according to claim 24 wherein the sheets have a thickness in the vicinity of the channels which is less than the thickness of the sheet at a lower end thereof, and wherein a portion of an upstream facing surface of the sheet in the vicinity of the open channel is recessed relative to a remainder of the surface at a lower end of the sheet, and wherein the filter material is also recessed relative to the surface remainder at the lower end of the sheet to prevent damage to the filter material when the sheet is driven into the ground.

26. An installation according to claim 25 wherein the filter material substantially fills a cross section of the channel, is substantially flush with the upstream facing, recessed surface portion, and permits water to flow longitudinally along the channel.

27. A sheet for the construction of ground water barriers at hazardous waste dump sites for collecting contaminated ground water, bringing it to the surface, treating it to remove hazardous waste contaminants therein, and thereafter returning the treated, contaminant-free water to the ground, the sheet being adapted to be driven directly into the ground and having a generally rectangular, elongated outline defining upstream and downstream sides, a pair of opposing longitudinal edges, a lower edge and an upper edge extending between the longitudinal edges, one of the longitudinal edges defining a longitudinal, open groove of a given depth and the other longitudinal edge defining a tongue shaped to fit into the groove and of a height less than the depth so that, when the tongue of one sheet is positioned in the groove of another sheet, the sheets form a longitudinal conduit between them, at least a portion of the upstream side of the sheet spaced from the lower edge being recessed relative to a remainder of the side in the vicinity of the lower edge, at least one open channel formed in the recessed portion of the side and in fluid communication with the groove and with an end of the tongue, and a filter material secured to the sheet and extending across the open channel permitting contaminated ground water to flow into the channel and preventing ground from entering the channel.

28. A sheet according to claim 27 wherein the sheet is made of concrete.

29. A sheet according to claim 27 constructed of wood.

30. A sheet according to claim 27 wherein the sheet is constructed of a center board, a first pair of side boards extending over the length and past one of the longitudinal edges of the center board to thereby define the groove with the one edge of the center board and opposing surfaces of the side boards projecting past the one edge, a second pair of side boards having longitudinal edges located inward relative to the other longitudinal edge of the center board so that an edge portion of the center board projecting past the second pair of side boards defines the tongue, the side board of the second pair on the upstream side of the sheet defining the recessed portion of the upstream side of the sheet, the center board further defining the open channel.

31. A sheet according to claim 30 wherein the center board is defined by longitudinal center board sections, ends of which are spaced apart and at the recessed portion of the upstream side to thereby define the open channel with end edges of the center board sections and surface portions of the side boards on the downstream side of the sheet.

32. A sheet according to claim 30 wherein at least a part of the lower edge is diagonally oriented relative to the side edges of the sheet and slopes downwardly in the direction of the lower edge from the other longitudinal edge towards the one longitudinal edge, whereby the sheet is biased in the direction of the groove when it is driven into the ground.

* * * * *